US011823530B2

(12) United States Patent
Freels et al.

(10) Patent No.: US 11,823,530 B2
(45) Date of Patent: *Nov. 21, 2023

(54) TRANSACTION SEQUENCES INCLUDING A LINKED DEAL WITHIN AN INITIAL DEAL

(71) Applicant: Powerhouse Gaming, Inc., Loomis, CA (US)

(72) Inventors: Nathan Andrew Freels, Loomis, CA (US); Travis Alan Meyer, Fair Oaks, CA (US); Mark Provan Newton, Omaha, NE (US); John Lance Wohlfarth, Sacramento, CA (US)

(73) Assignee: Powerhouse Gaming, Inc., Loomis, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/509,787

(22) Filed: Oct. 25, 2021

(65) Prior Publication Data

US 2022/0044521 A1     Feb. 10, 2022

Related U.S. Application Data

(63) Continuation of application No. 17/184,900, filed on Feb. 25, 2021.

(Continued)

(51) Int. Cl.
*G07F 17/32* (2006.01)
*G06Q 20/04* (2012.01)

(52) U.S. Cl.
CPC ..... *G07F 17/3244* (2013.01); *G06Q 20/0457* (2013.01)

(58) Field of Classification Search
CPC .............. G07F 17/3244; G06Q 20/0457
(Continued)

(56) References Cited

U.S. PATENT DOCUMENTS 5,984,779 A * 11/1999 Bridgeman ........... G07F 17/323
273/138.2
2002/0072404 A1 * 6/2002 Gerow ................. G07F 17/329
463/27

(Continued)

OTHER PUBLICATIONS

United States Office Action, U.S. Appl. No. 17/184,900, filed Jan. 26, 2023, 28 pages.

(Continued)

*Primary Examiner* — Werner G Garner
(74) *Attorney, Agent, or Firm* — Fenwick & West LLP

(57) ABSTRACT

A game terminal allows a player to participate in the linked transaction including a linked deal within an initial deal via their client account interacting with a management system. The management system manages the execution of the linked transaction including execution of the initial deal, execution of the linked deal, and movement and monitoring of capital during execution of the linked transaction. Initial deal tickets are electronically allocated to player accounts by the management system. The linked deal may be a secondary deal that is lightly linked to the initial deal. In particular, the initial deal may include an access ticket to the linked deal, and the access ticket allows the management system to grant the player a play in the linked deal. Both the initial deal and the linked deal can have prizes, and the management system may resolve those prizes, as necessary.

19 Claims, 10 Drawing Sheets

Related U.S. Application Data

(60) Provisional application No. 62/981,909, filed on Feb. 26, 2020.

(58) Field of Classification Search
USPC .......................................................... 463/25
See application file for complete search history.

(56) References Cited

U.S. PATENT DOCUMENTS

| | | | |
|---|---|---|---|
| 2002/0098882 A1 | 7/2002 | Lind et al. | |
| 2003/0022713 A1 | 1/2003 | Jasper et al. | |
| 2003/0125107 A1* | 7/2003 | Cannon | G07F 17/32 463/25 |
| 2004/0082384 A1* | 4/2004 | Walker | G07F 17/3237 463/40 |
| 2005/0064925 A1* | 3/2005 | Robb | G07F 17/32 463/16 |
| 2007/0072667 A1* | 3/2007 | Limacher | G07F 17/3223 463/16 |
| 2008/0171587 A1* | 7/2008 | Jackson | G07F 17/3262 463/20 |
| 2012/0289322 A1* | 11/2012 | Causley | G07F 17/3244 463/26 |
| 2019/0073877 A1* | 3/2019 | Deleon | G07F 17/3211 |

OTHER PUBLICATIONS

United States Office Action, U.S. Appl. No. 17/184,900, filed Jun. 24, 2022, 23 pages.

* cited by examiner

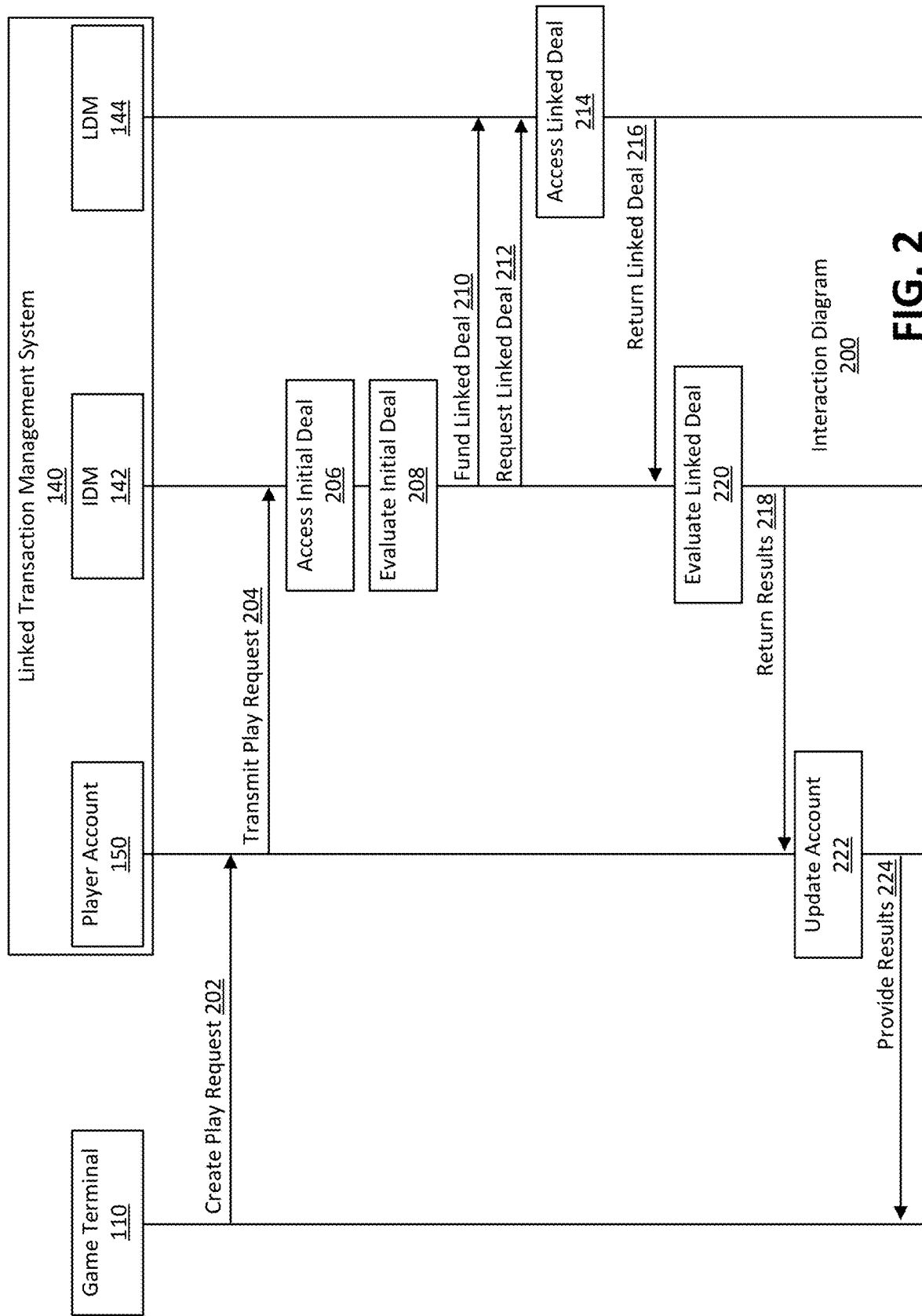

TRANSACTION SEQUENCES INCLUDING A LINKED DEAL WITHIN AN INITIAL DEAL

CROSS-REFERENCE TO RELATED APPLICATIONS

This application is a continuation of and claims the benefit of priority to U.S. patent application Ser. No. 17/184,900 filed Feb. 25, 2021, which claims the benefit of priority to U.S. Provisional Application No. 62/981,909 filed Feb. 26, 2020, the disclosures of both of which is hereby incorporated by reference in its entirety.

TECHNICAL FIELD

The disclosure generally relates to the field of electronic gaming systems, and, more specifically, a linked in game transaction for an electronic game system.

BACKGROUND

The use of seal cards in conjunction with traditional, paper pull-tabs adds a secondary element of chance above the instant win format of traditional pull-tabs. This format is only possible because each individual pull-tab is tangible and may be "held" by the player. "Hold tickets" are retained by the player until the seal card associated with the pull-tabs is opened after all pull-tabs in a deal are sold. This format is challenging to translate to electronic games because electronic pull-tabs are instantly revealed, and a prize is instantly awarded. Further, electronic pull-tabs are not physically retainable by the player, so electronic pull-tabs games with a secondary element of chance could not be designed and manufactured. The adoption of the linked transaction including a linked deal within an initial deal described herein solves this problem.

Moreover, the linked in-game transactions provided by the disclosed linked transaction are not possible in paper-based systems due to issues with deal completeness and player confusion. To illustrate, with paper pull-tab deals, a player may win an access ticket to a linked deal by opening their originally purchased ticket, but must know to redeem the access ticket for the linked deal at the initial deals location in order to participate in the linked play. Obviously, requiring secondary knowledge to the game system is confusing to players. Due to this confusion, players may not even redeem an accesses ticket for a linked deal, which causes accounting for both deals to become broken and neither deal will pay out correctly.

Electronic versions of linked transactions have yet to solve these issues and have yet to be implemented due to conceptional problems, for example, tracking and linking data relationships between multiple deals while maintaining a set of finite games (e.g., methods of accounting for capital flowing between deals, communicating the results to the player, and maintaining an accurate transactional history for auditing, etc.).

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 2 illustrates an interaction diagram of a linked game transaction sequence in the system environment, according to one example embodiment.

DETAILED DESCRIPTION

Figure 1A:
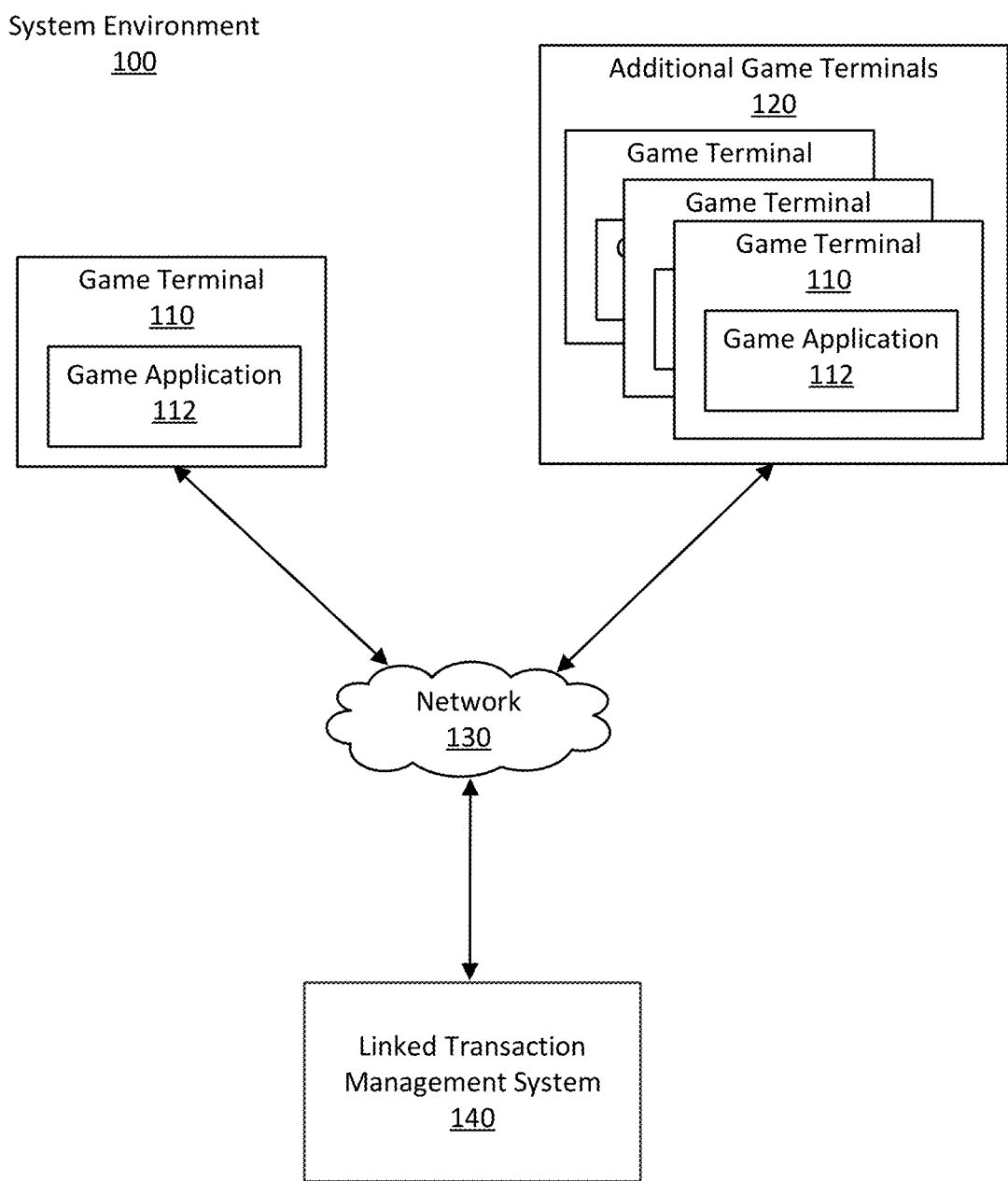
FIG. 1A illustrates a system environment for an electronic game system representing a linked transaction, according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Described is one embodiment of a disclosed system, method, and computer readable storage medium that includes a linked transactional sequence enabling the play a linked deal (e.g., pull-tab games) nested within an initial deal (e.g., a linked pull-tab game). All standard security for randomized pull-tab deal creation and encrypted pull-tab deal distribution may be maintained throughout this process.

As described herein, a game terminal allows a player to participate in the linked transaction. The game terminal may be a physical electronic computing device utilized by players to access their player account and interface with a management system managing the linked transaction. Several form factors for the game terminal are supported, each of which enables the linked transaction described herein.

The management system maintains an electronic player account (e.g., online) for the player. The player account may be a repository of all information relating to the play of deals within the linked transaction (e.g., electronic pull-tabs) by each individual player. The player is able to access their player account via the gaming terminal which constantly (e.g., real-time) reflects the current state of the player account and the linked transaction.

The management system manages the execution of the linked transaction including execution of the initial deal, execution of the linked deal, and movement and monitoring of capital during execution of the linked transaction. In an example, the initial deal is akin to an industry standard deal of instant win pull-tabs. Initial deal tickets are electronically allocated to player accounts from the management system. The linked deal may be a secondary deal of pull-tabs that is lightly linked to the initial deal. That is, pull-tabs from the initial deal may include an access ticket to the linked deal, and the access ticket allows the management system to grant the player account a pull-tab from the linked deal. Pull-tabs from the linked deal can indicate various prizes depending on the configuration of the linked transaction. For example, pull-tabs for the linked deal may determine if a player wins a progressive prize or a consolation prize.

I. Introduction

As described above, pull-tab games are a popular style of games of chance that has migrated to an electronic forum. However, the also popular secondary "seal card" games that link the pull-tab games to a secondary game with an additional layer of luck have not migrated to an electronic format because of difficulties in monitoring data movement, reliably linking of that data through transactions (e.g., capital movement) through the system, ensuring deal completeness, ensuring legal technical completeness and reliability of deals, and a variety of other factors.

Disclosed herein is an electronic game utilizing a linked transaction similar to the popular "seal card" games. The linked transaction comprises a linked deal within a lightly linked initial deal. The linked transaction is managed by a linked transaction management system. Players interact with a player terminal to access their account on the management system and participate in the linked transaction. The layered structure of the linked transaction and its execution by the management structure are described hereinbelow.

II. System Environment for a Linked Transaction

FIG. 1A illustrates a system environment for an example electronic game system representing a linked transaction, according to one example embodiment. The electronic game may include games of chance. The system environment 100 includes a game terminal 110, additional game terminals 120, a network 130, and a linked transaction management system ("management system") 140. Other embodiments of the system environment 100 are also possible, and the system may include additional or fewer elements.

The management system 140 manages the linked transaction within the system environment 100. For example, the management system 140 may receive a request from a game terminal 110 to participate in the linked transaction ("play request") and the management system 140 manages the resulting linked transaction. Additionally, the management system 140 may manage the allocation and movement of capital throughout the system environment 100 during the linked transaction. For example, the management system 140 may provide a technical framework to legally achieve the linked transaction. For example, the management system may receive capital, grant capital, or move capital within, or as a result of, the linked transaction. The management system 140 may also provide instructions for displaying any or all parts of the linked transaction on a display of the game terminal 110. For example, the management system 140 may provide instructions to display the initial deal, the linked deal, payouts, rules, options, etc. on a display of the game terminal 110. The functionality of the management system 140 is described in greater detail below in regard to FIG. 1B.

The game terminal 110 is a computing terminal configured to allow a player at the game terminal 110 to participate in a linked transaction. The game terminal 110 includes a game application 112 configured to allow the game terminal 110 to interact with the management system 140 over the network 130 (e.g., via an API). Other game applications may also be instantiated on the game terminal 110. To illustrate, the game terminal 110 may be a terminal in a casino that allows a user to interact and participate with various game applications executing on the terminal. Interactions can include voice commands, touch commands, keyboard commands, and the like.

One or more additional game terminals 120 may also be present in the system environment 100 such that additional players can participate in the linked transaction. The additional game terminals 120 may or may not be collocated with the game terminal 110. Similarly, the management system 140 may or may not be collocated with the game terminal 110 or additional game terminals 120.

The management system 140 is in communication with the game terminal 110 and the additional game terminals 120 via a network 130. In an embodiment, the network 130 is the Internet or any combination of one or more of a local area network (LAN), a metropolitan area network (MAN), a wide area network (WAN). The one or more networks may include one or more of a mobile (e.g., cellular) network, wired (e.g., ethernet) or wireless (e.g., WiFi) network, a private network, or a virtual private network. Other networks are also possible, and the networks may adhere to data security protocols necessary to secure an electronic gaming environment.

The system environment 100 includes a number of "systems" (e.g., management system 140 and game terminal 110). Systems refer to hardware components and/or computational logic on a hardware system for providing functionality. That is, a system can be implemented in hardware, firmware, and/or software (e.g., a hardware server comprising computational logic, or a gaming terminal comprising software). Other embodiments can include additional systems, can distribute functionality between systems, can attribute functionality to more or fewer systems, can be implemented as a standalone system or as part of system network, and can be loaded into memory executable by processors. In one particular example, various aspects of the management system 140 can be distributed between one or more systems. To illustrate, an initial deal from a linked transaction can be managed by a first management system 140, while a linked deal from the linked transaction may be managed by a second management system 140. In another example, any or all functionality of the management system 140 may be included in the game terminal 110 to reduce data transmission across the network 130, thereby increasing information security.

III. Management System for a Linked Transaction

Figure 1B:
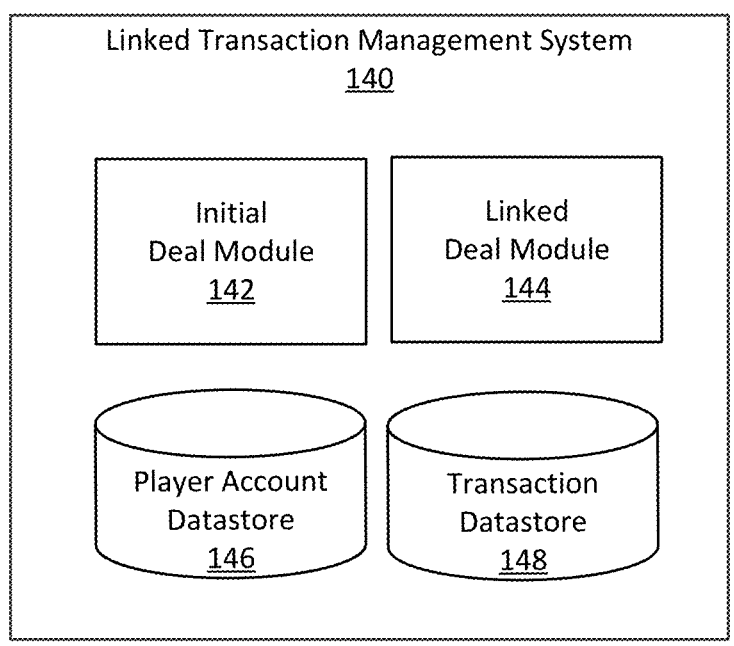
FIG. 1B illustrates a management system within the system environment, according to one example embodiment.

As described above, the system environment 100 includes a management system 140 for managing a linked transaction. FIG. 1B illustrates an example management system within the system environment, according to one example embodiment. The management system 140 includes an initial deal module 142, a linked deal module 144, a player account datastore 146, and a transaction datastore 148. The initial deal module 142 ("IDM 142") and a linked deal module 144 ("LDM") manage deals within a linked transaction. The player account datastore 146 stores player (or user) accounts and player account information. The transaction datastore 148 securely stores information for the deals in the linked transaction.

As described above, players interact with the game terminal 110 to participate in a linked transaction via the network 130. In an embodiment, the game terminal 110 connects to a player account stored in the player account datastore 146 to participate in the linked transaction. The player account includes various information necessary for a player at the game terminal 110 to participate in the linked transaction. For example, the player account can include information describing an amount of capital associated with the player account, player funding information (e.g., credit cards, bank accounts, etc.), player preferences, etc.

To describe how a player account participates in a linked transaction within the management system 140, it is useful to describe the structure of the initial deal and the linked deal within a linked transaction.

To begin, the transaction datastore 148 stores all information necessary for executing the initial deal and the linked deal within the linked transaction. Some of the stored information reflects a layered structure of the linked deal within the initial deal. Each deal and the layered structure are described in more detail below.

The transaction datastore 148 stores the initial deal. The initial deal, in one example, is an electronic pull-tab game. As such, the initial deal comprises a randomized ordered list of pull-tabs. One or more of the pull-tabs of the randomized ordered list of pull-tabs may include a prize for the initial deal. Prizes may be money, items, additional plays, or some other prize. One or more of the prizes of the initial deal may be an access ticket for a linked deal. Additionally, the transaction datastore 148 may store several different types of initial deals, all of which may have different prizes, odds, and prices. That is, the transaction datastore 148 may store a multitude of different initial deals.

The transaction datastore 148 also stores the linked deal. The linked deal, in one example, is another electronic pull-tab game. As such, the linked deal comprises a randomized ordered list of pull-tabs. One or more of the pull-tabs of the randomized ordered list of pull-tabs may include a prize for the linked deal. Prizes may be physical (e.g., money, items) or virtual (e.g., virtual reward), and/or some other prize (e.g., comps such as credits for additional play). Additionally, the transaction datastore 148 may store several different types of linked deals, all of which may have different prizes, odds, and prices. That is, the transaction datastore may store a multitude of different linked deals.

The transaction datastore 148 also stores information representing the layered structure of the linked transaction where each linked deal is lightly linked to one or more initial deals. For example, consider a linked deal manufactured to include a randomized ordered list of M (M being an integer) pull-tabs. In addition, N (N being an integer) initial deals are manufactured such that each of the M pull-tabs of the linked deal correspond to M access tickets winnable within the N initial deals. Each of the N initial deals may contain one or more of the M access tickets depending on the configuration of the linked transaction, and all of the M access tickets corresponding to the M pull-tabs of the linked deal are allocated across the N initial deals. Thus, the linked transaction is structured such that participation in a linked deal is necessarily a possible result of participation in one of its lightly linked initial deal. Further, within this structure, the linked deal remains active until the entirety of the N initial deals linked to the linked deal are exhausted, even if all of the prizes of the linked deal have been claimed.

Furthermore, the described layered structure is not intended to be limiting, it is but one possible linking structure between initial deals and linked deals. Other styles of linked transactions and structures are also possible. In other words, the initial deal or the linked deal may be another type of electronic game, and the games may be more strongly or lightly linked, or have different layers of linking, as desired. Whatever the configuration of the linked transaction, the transaction datastore 148 securely stores information for deals within the linked transaction.

Turning now to the execution of the linked deal within this layered structure, the IDM 142 provides the functionality necessary for executing the initial deal of the linked transaction. To illustrate, when the IDM 142 receives a play request for a linked transaction from a player account, the IDM 142 executes the initial deal of the linked transaction. The IDM 142 executes the initial deal by requesting the next pull-tab from the randomized ordered list of pull-tabs corresponding to the play request from the transaction datastore 148. The IDM 142 then evaluates the pull-tab to determine if the pull-tab is one of those associated with a prize, and the IDM 142, if necessary, resolves the prize. In some embodiments, the player account resolves a prize rather than the IDM 142.

The LDM 144 provides the functionality necessary for executing the linked deal of the linked transaction. In this regard, there are several notable differences between how the IDM 142 manages the initial deal and how the LDM 144 manages the linked deal due to the layered structure of the linked transaction. Principally, the LDM 144 executes a linked deal in response to a request from the IDM 142 and not from a player account. In other words, a player account cannot directly request participation in a linked deal because a request for a linked deal must originate from within an initial deal.

To illustrate, consider an initial deal with an access ticket to its corresponding linked deal as a prize (i.e., the two are lightly linked). In this example, the player account transmits a play request to the IDM 142, and the IDM 142 accesses the next pull-tab from the randomized ordered list of pull-tabs for the initial deal from the transaction datastore 148. The IDM 142 evaluates the next pull-tab and determines the prize is an access ticket to a linked deal. The IDM 142 then transmits a play request for the linked deal the LDM 144, and the LDM 144 accesses the next pull-tab from the randomized ordered list for the linked deal associated with the access ticket. The LDM 144 then transmits the next pull-tab to the IDM 142, and the IDM 142 evaluates the next pull-tab to determine a prize for the linked deal, if any. This process is described in greater detail with regard to FIG. 2 and FIG. 3.

The management system 140 also enables the secure movement of capital (e.g., credit having transactional value such as money, funds, bitcoin, tokens, etc.) through the system environment 100. For example, the player account datastore 146 maintains a variety of player accounts, each of which may be associated with capital value usable to participate in a linked transaction within the system environment 100. Player accounts may be credited and debited based on client instruction, or may be credited or debited during participation in a linked transaction. More generally, a player may use her player account to execute any necessary financial transactions to participate in the linked transaction. Some example financial transactions include crediting her player account from an associated bank account, debiting her player account as a payout in a gaming room, debiting her player account to participate in a linked transaction, or crediting her player account based on the resolution of an initial deal or a linked deal from the linked transaction. Many other examples are possible The management system 140 also enables movement of capital between the player accounts, the IDM 142, and the LDM 144 during a linked transaction. For example, the player account can transmit a play request to the IDM 142, and the play request can include entrance capital debited from the player account. Entrance capital is the funds necessary to participate in the linked transaction and comprises funds for both the initial deal and the linked deal. That is, a portion of the entrance capital (e.g., 60%, 70%, 80%, etc.) is allotted for payouts of the initial deal, while another portion of the entrance capital (e.g., 5%, 10%, 15%, etc.) is allotted for funding the linked deal.

Furthermore, while the entrance capital comprises funds for both the initial deal and the linked deal, the player account only deposits the entrance capital with the IDM 142. To illustrate, for example, a player account transmits a play request to the IDM 142, and, correspondingly, the player account provides $10 of entrance capital to the IDM 142. The IDM 142 sets aside a certain value, for example, $7 of the entrance capital, into an initial deal pool, and another value, for example, $2 of the entrance capital, into a linked deal pool. The IDM 142 uses the initial deal pool as prizes for the initial deal but uses the linked deal pool for funding the linked deal. For example, when a player account resolves an initial deal with an access ticket for a linked deal as a prize, the IDM 142 funds the linked deal associated with the access ticket with capital in the linked deal pool.

In other words, the initial deal contributes a portion of the entrance capital to the linked deal, despite the player account not directly funding a linked deal via the LDM 144. This structure is feasible because the linked deal is lightly linked to the initial deal at manufacture and the entrance capital is split into an initial deal pool and a linked deal pool. In this manner, the cost of funding payouts for the linked deal is amortized across several initial deals, or, more explicitly, a particular linked deal is funded by the entrance capital reserved to the linked deal pools of all of its lightly linked initial deals.

The structure of the linked transaction also enables the management system 140 to monitor funds moving within the system environment 100 (e.g., payouts, debits, credits, prizes, etc.) because the player account does not have access to capital in the initial deal pool or linked deal pool. As such, the management system 140 can substantively audit any of the monetary interactions that occur therein. Additionally, not allowing the player account to directly fund the linked deal removes a forced choice from the linked transaction. That is, when winning a prize for the initial deal, the player using the player account may feel purchasing an access ticket is unnecessary or unwarranted (e.g., because the expected value of win the initial deal is the same as the purchase price of the access ticket). In these instances, unless prevented from doing so, the player may remove money from the linked deal pool and cause corresponding issues for funding the linked deal.

Additionally, switching from an initial deal to a linked deal is an intrinsic and unique part of the linked transaction process. This "deal switching" permits the secondary element of chance inherent in the linked deal to be accessible to the player. This cannot be done by conventional pull-tab systems as they lack the dynamic (on demand) use of some form of random number generator. Utilizing deal within deal allows the secondary element of chance to be contained within the randomization of the linked deal which happens at point of manufacture and not at the point of consumption.

Moreover, jurisdictions that allow the play of electronic pull-tabs (e.g., the initial deal and linked deal) specifically prohibit the use of any reflexive software or additional elements of chance in the play of the game. Accordingly, no secondary random number generators are contained within the management system 140, including the IDM 142 and LDM 144. Therefore, each deal is only randomized once prior to manufacture and delivery to the management system 140. After delivery, each pull-tab from the randomized ordered set of pull-tabs allocated sequentially as part of linked transactions, one after another. The result is functionally similar to a random number generator randomly selecting an unsold ticket out of the pool of tickets in the deal at the time of purchase. However, results including a secondary random number generator functionally similar to a slot machine's continuous math model is not allowed and is not implemented.

It is noted that the management system 140 includes a number of "modules." For example, IDM 142 and LDM 144. Modules refer to hardware components and/or computational logic for providing the specified functionality. That is, a module can be implemented in hardware, firmware, and/or software (e.g., a hardware server comprising computational logic), other embodiments can include additional modules, can distribute functionality between modules, can attribute functionality to more or fewer modules, can be implemented as a standalone program or as part of a network of programs, and can be loaded into memory executable by processors. The processors may be programmed with program code for execution of the functionality described. The program code with the functionality described also may be configured and instantiated within field programmable gate arrays (FPGAs) or application specific integrated circuits (ASICs).

Moreover, the management system 140 may have other embodiments. For example, in some embodiments, the management system 140 may include additional or fewer modules and/or datastores. Further, the capabilities attributed to management system within the environment 100 may be distributed to one or more other systems within the system environment 100. For example, any or all of the functionality of the player account datastore 146 may be accomplished by the game terminal 110.

IV. System Interactions for a Linked Transaction

FIG. 2 illustrates an interaction diagram describing the execution of a linked transaction within a system environment, according to one example embodiment. Within the illustrated interaction diagram 200 the system environment 100 is similar to that described in FIG. 1, but could be another system environment 100.

FIG. 2 includes a horizontal line of boxes along the top of the figure (e.g., game terminal 110, player account 150, etc.). Each box represents a different element within the system environment 100. Originating at the bottom of each box is a line that stretches to the bottom of the figure. Boxes occurring on this line represent actions that occur at its corresponding element in the system environment 100. Similarly, arrows between lines represent interactions between the corresponding elements, with their directionality approximating the flow of information between those elements. Temporally, the actions and interactions in the interaction diagram 200 flow from the top of the figure to the bottom of the figure.

In the illustrated interaction diagram 200, the IDM 142, LDM 144, and player account 150 reside on the management system 140 configured to execute a linked transaction. The player account 150 is accessed by a player from the player account datastore 146. The IDM 142 manages the initial deal. The initial deal is a first pull-tab game comprising a first randomized ordered list of pull-tabs but could a different type of initial deal. The LDM 144 manages the linked deal. The linked deal is a second pull-tab game comprising a second randomized ordered list of pull-tabs. Finally, the initial deal is lightly linked to the linked deal as described above. In this example, the initial deal functions similarly to a pull-tab game with the linked deal functioning similarly to a seal-card for that pull-tab game. Other styles of linked transactions are also possible.

To begin, a player interacts with the game terminal 110. The player may interact with the game terminal 110 to create a player account 150 on a management system 140 or may access an existing account on the management system 140. If necessary, the player may also add capital to the player account 150 such that she can fund a linked transaction at the management system 140.

The player interacts with the game terminal 110 to create a play request 202 for their player account 150. In creating the request, the player account 150 verifies that there is sufficient entrance capital to fund the requested linked transaction. If the player account 150 does not have sufficient capital to fund the linked transaction, the player account 150 may provide a response to the player at the game terminal 110 indicating insufficient capital. The game terminal 110 may provide the game terminal 110 with a notification for the player requesting the additional capital necessary to fund the requested linked transaction, and the player may interact with the game terminal to provide the necessary capital.

The player account 150 transmits the play request 204 to the IDM 142. In this example, the play request includes entrance capital sufficient for funding both the initial deal and the linked deal of the linked transaction. For example, the player account 150 provides $100 in entrance capital to the IDM 142 to participate in the linked transaction. The IDM 142 places $80 in the initial deal pool and reserves $10 in the linked deal pool. In this manner, the linked transaction provides payouts at 90% to participants in the initial deal and at 100% to participants in the linked deal. Of course, the payouts may be prizes resolved by other players at additional game terminals 120 within the system environment 100 participating in the linked transaction, and each of the prizes may or may not be different.

The IDM 142 accesses the initial deal 206 of the linked transaction from the transaction datastore 148. Accessing the initial deal, in this example, includes accessing the next pull-tab from the first randomized ordered list of pull-tabs stored in the transaction datastore 148.

The IDM 142 then evaluates the initial deal 208. Evaluating the initial deal can include providing instructions to the game terminal 110 for displaying an interface for the initial deal and receiving instructions from the game terminal 110 to resolve the initial deal. For example, the game terminal 110 may display the next pull-tab of the initial deal to the player and receive a player interaction to resolve the displayed next pull-tab of the initial deal.

When resolving the initial deal, the player may receive an access ticket for the linked deal as a prize (e.g., a "golden ticket"). In this case, the IDM 142 can notify the player as to the prize. Notifying the player as to the prize can include transmitting a notification to the game terminal 110 for display to the player.

As the player won an access ticket to the linked deal, the IDM 142 funds the linked deal 210 associated with the access ticket. For example, the IDM 142 may transmit capital stored in the linked deal pool to the LDM 144 to fund the linked deal. This step occurs because the player account 150 cannot directly request and fund a linked deal from the LDM 144.

Additionally, the IDM 142 requests the appropriate linked deal 212 from the LDM 144. Here, the appropriate linked deal is the linked deal that is lightly linked to the initial deal providing the access ticked.

The LDM 144 accesses the linked deal 214 of the linked transaction from the transaction datastore 148. Accessing the linked deal, in this example, includes accessing the next pull-tab from the second randomized ordered list of pull-tabs stored in the transaction datastore.

The LDM 144 returns the linked deal 216 to the IDM 142. That is, the LDM 144 provides the linked deal to the initial deal such that the player can interact with the linked deal from within the initial deal.

The IDM 142 evaluates the linked deal 220. Evaluating the linked deal can include providing instructions the game terminal 110 for displaying an interface for the linked deal and receiving instructions from the player to resolve the initial deal. For example, the game terminal 110 may display the next pull-tab of the linked deal to the player and receive a player interaction to resolve the displayed next pull-tab of the linked deal.

The IDM returns the results 218 from the linked transaction to the player account 150. The results may include prizes for the initial deal and/or the linked deal depending on their resolution.

The player account 150 updates the account 222 based on the results to the linked transaction. That is, by updating any capital on account to reflect the resolution of the linked transaction including: (1) debiting the account entrance capital for the linked transaction, (2) crediting the account based on the resolution of the initial deal, if necessary, and (3) crediting the player account 150 based on the resolution of the linked deal, if necessary.

The player account 150 provides the results 224 of the linked transaction to the game terminal 110. Providing the result may include providing instructions to display results of the linked transaction on a display of the game terminal.

The aforementioned interaction diagram 200 is not intended to exhaustively describe interactions between the various systems and modules when executing a linked transaction. For example, there may be many more game terminals 120 and player accounts interacting with the IDM 142. Further, any of the systems and modules described herein may provide the appropriate information and instructions to the game terminal 110 to enable user interaction and engagement throughout the linked transaction. For example, providing information to the player to display the status of a pull-tab, odds for an initial deal or linked deal, options for prizes, etc.

V. Example Workflow for a Linked Transaction

Figure 3:
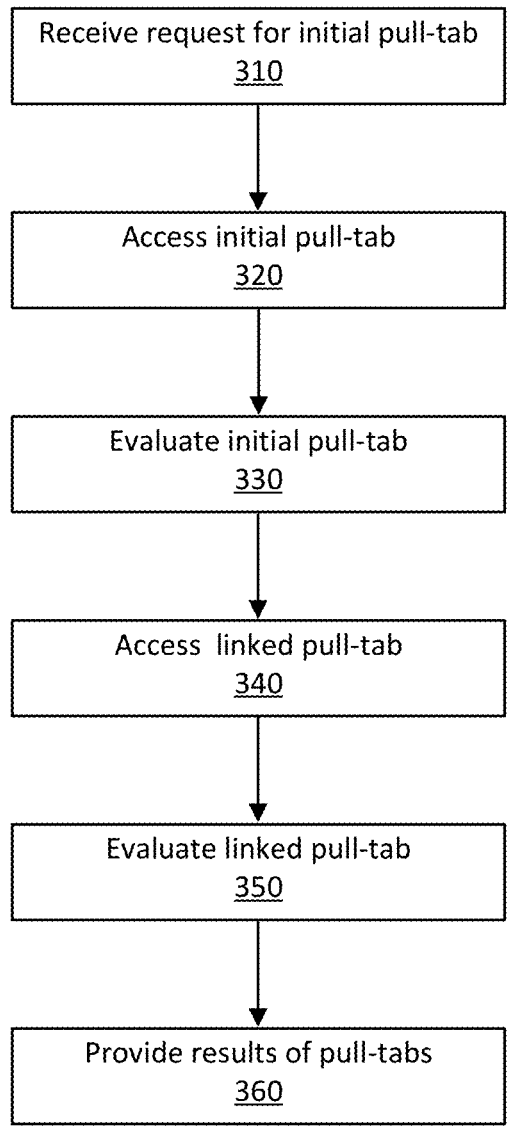
FIG. 3 illustrates a workflow diagram describing a linked game transaction sequence, according to one example embodiment.

FIG. 3 illustrates a flow diagram of a executing a linked transaction comprising a linked deal within an initial deal, according to one example embodiment. In various embodiments, the method 300 can include additional or fewer steps and/or the steps may occur in another order.

A player at a game terminal 110 interacts with a game application 112 to participate in an electronic game. The player interacts with the game terminal 110 to login to a player account stored in a player account datastore 146 on the management system 140 for the linked transaction.

The player utilizes the game terminal 110 to elect to participate in the linked transaction on the management system 140. In some embodiments, the player is offered a variety of linked transactions in which they may participate, and the player selects one of the linked transactions. Each of the selectable linked transactions may have different prizes and odds, may be linked to different linked deals, and may be different types of games.

Here, the player selects a linked transaction that comprises a linked deal within an initial deal. More specifically, the initial deal is an electronic pull-tab game comprising a randomized ordered list of pull tabs stored in the transaction datastore 148 of the management system 140. The linked deal is an electronic pull-tab game comprising a second randomized ordered list of pull-tabs stored in the transaction datastore 148 of the management system 140. The first deal is lightly linked to the second deal as described above, and the pull-tabs from both games are sequentially allotted when requested.

To begin play, the player account requests an initial pull-tab for the initial deal from the management system 140 and the management system 140 receives 310 the request. The management system 140 then accesses 320 the next pull-tab from the first randomized ordered set of pull-tabs (i.e., an initial pull-tab), and the management system 140 evaluates 330 the initial pull-tab. In resolving the initial pull-tab, the management system 140 may interact with the player account and the game terminal 110 such that the player can resolve the initial pull-tab.

After resolving the initial pull-tab, the management system 140 can take a variety of actions based on the whatever prize was won for the initial deal. For example, the management system 140 may ask a player if they wish to participate again, may provide a player account with prize capital, receive an access tick for a linked deal, etc.

In the case where the prize for the initial deal is an access ticket for the linked deal, the management system 140 accesses 340 the next pull-tab from the second randomized ordered set of pull-tabs of the linked deal (i.e., a linked pull-tab) and evaluates the linked pull-tab. In resolving the linked pull-tab the management system may interact with the player account and the gaming terminal such that the player can resolve the linked pull-tab.

After resolving the linked pull-tab, the management system 140 can take a variety of actions based on the whatever prize was won for the linked deal. For example, the management system 140 may provide a player account with prize capital for the linked deal, etc.

The management system then provides 360 the results (e.g., prize winning for the linked deal and/or initial deal) to the player account for updating any funds on account as necessary. Additionally, the management system provides the results for display on the game terminal 110.

VI. Variations on Linked Transactions

One of the intrinsic benefits of the layered structure of a linked transaction is the flexibility to provides to game designers to create different multilayered experiences for players without the need for additional or secondary random number generator results to vary game play experiences.

Notably, the following examples are not an exhaustive list of implementations of a linked transaction game experience.
Progressive Seal Card In an example, the linked transaction may include a progressive seal card game. In this example, the linked deal includes a randomized ordered set of pull-tabs. The pull-tabs contain all possible outcomes of a progressive seal card as prizes. The prizes are assigned to individual pull-tabs that are then shuffled and encrypted within the randomized ordered set of pull-tabs. When executing the linked deal, the pull-tabs are allocated sequentially to enable the play of the progressive seal card.

When resolving the linked deal, the results are presented as windows in a user interface provided for display on a screen of the game terminal. Any window may be selected by the player, but the outcome is determined by the sequence of the shuffling of pull-tabs in the linked deal during manufacture. The outcomes include whether the player is awarded a consolation prize or the progressive prize. The value of the consolation prize awarded determines the amount, if any, that the progressive prize is increased.

To further illustrate, the interactions of a linked transaction including a progressive seal card as a linked deal is described. The game terminal 110 creates a play request for the linked transaction and transmits the play request to the management system 140 hosting the player account 150 of the player. The player account 150 requests a pull-tab from the initial deal from the IDM 142. The IDM 142 accesses the next pull-tab from its randomized ordered list of pull-tabs for the initial deal. This accessed next pull-tab is resolved to determine if it includes an access ticket for the linked deal. If an access ticket is revealed, the IDM 142 provides funding (according to the games rules) to the linked deal, and the IDM 142 requests the next pull-tab from the randomized ordered list of pull-tabs contained within the linked deal.

The LDM 144 delivers the next pull-tab of the linked deal to the IDM 142. The IDM 142 returns the results of the pull-tab received from the linked deal along with the prize (if any) awarded from the initial deal to the player account 150. The player account 150 processes the results of both pull-tabs received and updates account information including both transaction information and player balance information. The results of the play of both pull-tabs is then provided to the game terminal 110 for display to the player according to the rules of the progressive seal card game.
Standard Seal Card The linked transaction can include a linked deal functioning similarly to a seal card associated with a pull-tab game. In this case, the initial deal includes a randomized ordered set of pull-tabs, and the linked deal includes a randomized ordered set of pull-tabs that contain the possible outcomes of the seal card. The outcomes of the linked deal are assigned to individual pull-tabs which are then shuffled and encrypted. The linked deal pull-tabs are allocated sequentially during execution of the linked deal. When displaying the results, the game terminal 110 allocates information to particular windows as selected by the player, but the sequence of outcomes is determined by the shuffling of pull-tabs during manufacture.
Double Up The linked transaction can include a linked deal functioning similar to a "double up" game. In this case, the linked game includes a randomized ordered set of pull-tabs which contain prizes equal to double the funding value or nothing. The prizes are assigned to individual pull-tabs that are then shuffled and encrypted. The linked deal pull-tabs are allocated sequentially during execution of the linked deal.

Bonus Rounds

The linked transaction can include a linked deal functioning similar to a "bonus round" game. In this case, the linked game includes a randomized ordered list of pull-tabs which contain bonus round prizes. That is, the bonus round prizes provide a player additional games presented within the initial deal. The prizes are assigned to individual pull-tabs that are then shuffled and encrypted. The linked deal pull-tabs are allocated sequentially during execution of the linked deal.

VII. Example Linked Transaction User Interfaces

FIGS. 4A-4J illustrate example interfaces displayable by a game terminal during execution of a linked transaction, in accordance with one example embodiment. The interfaces, or information within the interfaces, may be provided for display on the game terminal 110 from the management system.

Figure 4A:
FIGS. 4A-4J illustrates an example game interface for a linked game transaction, according to one example embodiment.

FIG. 4A is an example user interface that may occur during execution of an initial deal within a linked transaction. That is, in this example, a game terminal 110 is displaying an initial deal including an instant win pull-tab game. Here, the user may interact with the initial deal by interacting with 'PLAY' button on the bottom right.

Figure 4B:

FIG. 4B is a user interface that may occur during resolution of the initial deal within a linked transaction. That is, in this example, the game terminal 110 is displaying a result of an initial deal including the result of an instant win pull-tab game. Here, the result includes an access ticket for a linked deal as a prize, where the linked deal is a progressive pull-tab game. The access ticket is used to trigger participation in the linked deal within the linked transaction. The result indicating participation in the linked deal is a row of four-leaf clovers each bearing a label of "Progressive."

Figure 4C:
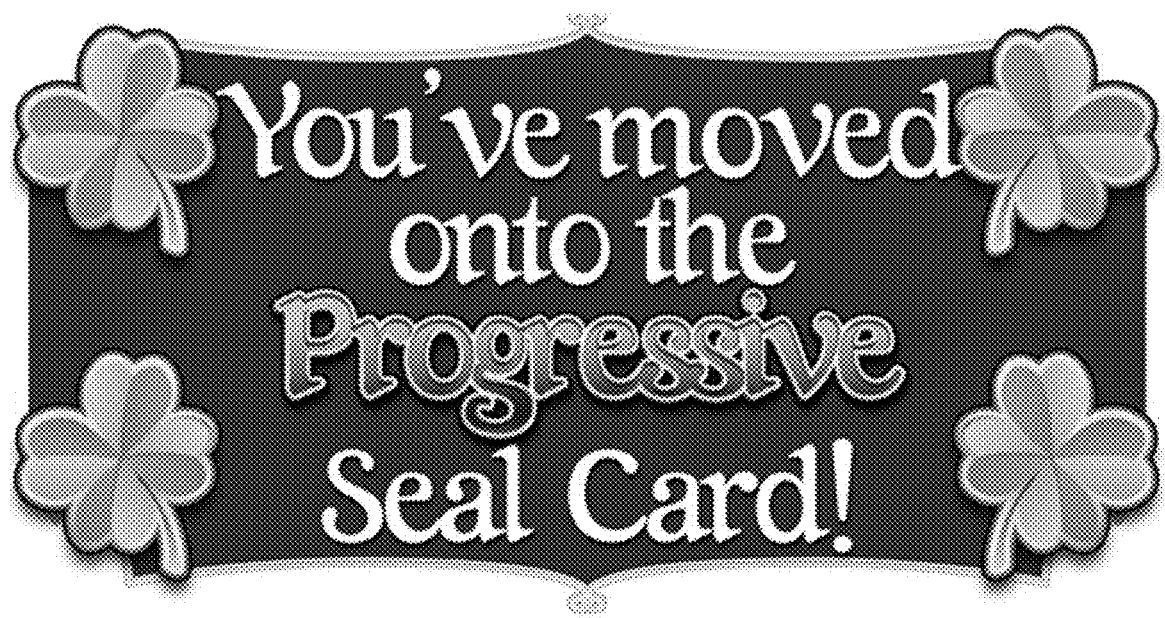

FIG. 4C is an example user interface that may occur between execution of the initial deal and the linked deal in a linked transaction. Here, the game terminal 110 displays a figure indicating a transition between the instant win pull-tab game of the initial deal to the progressive pull-tab game of the linked deal.

Figure 4D:

FIG. 4D is an example user interface that may occur during execution of the linked deal. In particular, the user interface is displayed on the game terminal 110 at the beginning of the linked deal to introduce the progressive pull-tab game.

Figure 4E:
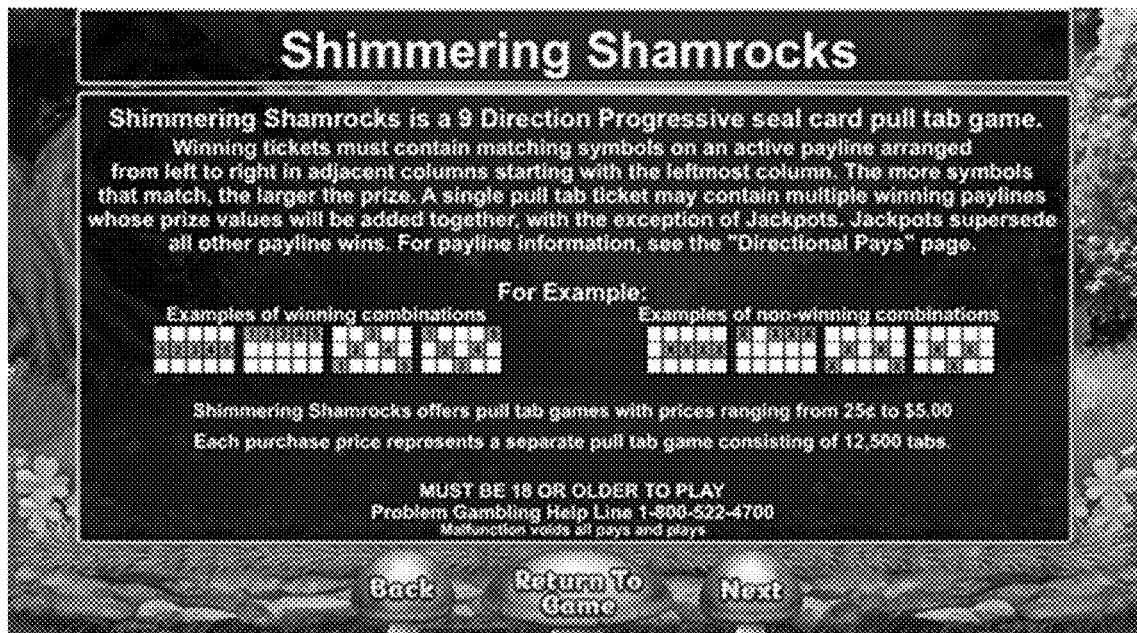

FIG. 4E is an example user interface that may occur during execution of the linked deal. In particular, the user interface is a help screen displayable during execution of the linked deal. To illustrate, if the player at the game terminal 110 optionally selects "HELP" from the user interface (e.g., the interface in FIG. 4D), the user interface may update on the screen of the game terminal 110 to show the help screen shown in FIG. 4E.

Additionally, the illustrated interface allows the players to select a type (e.g., purchase price) of the initial deal pull-tab being played. Each type allows the player to select the initial deal pull-tab from various initial deals. Each of the initial deal pull-tabs has a unique set of prizes at a specified price point. The buttons on the screen (e.g., "tab up" and "tab down") allow the player to increase the price, decrease the price, or select the max price available. Once selected the play button purchases the next pull-tab from the selected initial deal.

Figure 4F:

FIG. 4F is an example user interface that may occur during execution of the linked deal. In particular, the user interface is displayed on the game terminal 142 after selecting a rules button within the linked deal. The rules interface introduces the linked deal including the progressive pull-tab game.

Additionally, in this example user interface, it is noted that the Back, Return to Game, and Next pixels are navigation buttons used to navigate the help screens. When selected by the player, Back and Next take you to the next and the previous help screen. However, when selected by the player, "Return to Game" exits the help screens and returns the system to a playable state.

Figure 4G:

FIG. 4G is an example user interface that may occur during execution of the linked deal. In particular, the user interface is displayed by the game terminal 142 to enable the player to interact with the linked deal. That is, the user interacts with the illustrated screen to play the linked deal. The illustrated interface may be displayed when the player interacts with the terminal to proceed to the linked deal.

Figure 4H:

FIG. 4H is an example user interface that may occur during execution of the linked deal. In particular, the user interface is displayed by the game terminal 142 after a user has interacted with an interface to participate in the linked deal. Here, the user has played the bottom left card of the interface.

Figure 4I:
Figure 4J:

FIG. 4I is an example user interface that may occur during execution of the linked deal. In particular, the user interface is displayed on the game terminal 110 if the selected card in the linked deal is a winning card. Here, the user interface on the screen of the game terminal 110 updates to show the illustrated win message.

FIG. 4I is an example user interface that may occur during execution of the linked deal. In particular, the user interface is displayed on the game terminal 110 if the selected card is not a winning card. Here, the user interface on the screen of the game terminal 110 updates to show that the progressive prize is growing to a new value.

Upon winning or losing the linked deal, the linked deal exits and returns to the initial game. The user interface of the game terminal 110 may correspondingly update to return to the screen displayed during execution of the initial deal (e.g., FIG. 4A or FIG. 4B). Here, the player can resume play in the initial deal or start a new initial deal.

VIII. Computing Machine Architecture

Figure 5:
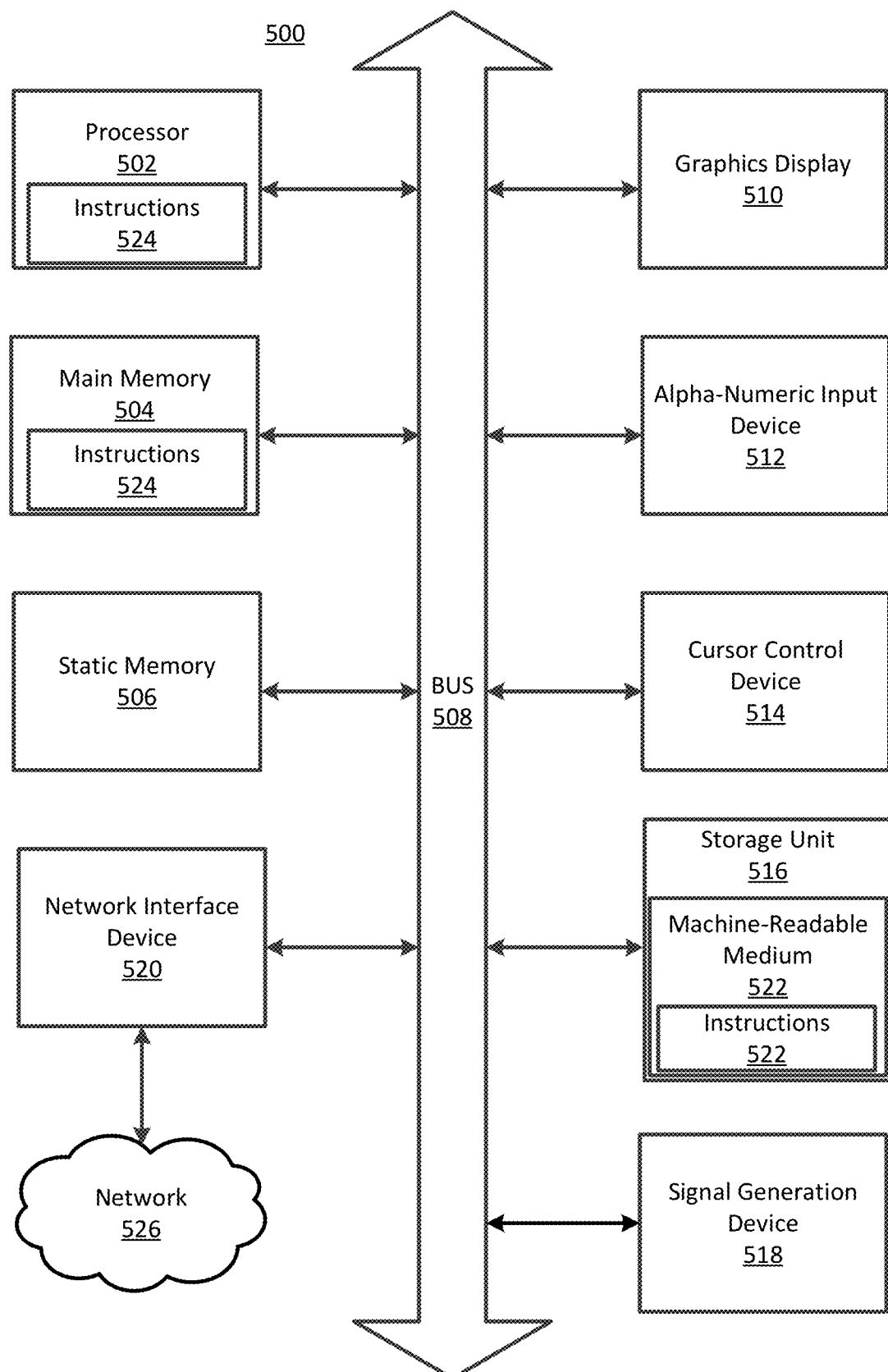
FIG. 5 illustrates a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller).

Specifically, FIG. 5 shows a diagrammatic representation of a machine in the example form of a computer system 500 within which program code (e.g., software) for causing the machine to perform any one or more of the methodologies discussed herein may be executed. In this example, the computer system 500 may be the game terminal 110 or the management system 140. The game terminal 110 and management system 140 may have some or all of the components of the computer system 500, but includes at least the processor 502 and a memory 504. The program code may be comprised of instructions 524 executable by one or more processors 502. In this example, the instructions (or program code or software) may include the program functionality to execute a deal within a game deal as described here.

In alternative embodiments, the machine operates as a standalone device or may be connected (e.g., networked) to other machines. In a network deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alpha-numeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

IX. Additional Configuration Considerations

The methods and systems described above provide a technical framework that enables a game of chance heretofore unrealized in an electronic format to be implemented. For example, the lightly linked data structure where pull-tabs from a linked deal are assigned to pull-tabs in an initial deal provide a technical backbone that ensures that an electronic game may be completed to fullness. That is, creating lightly linked data structures of pull-tabs allows disparate servers and remote server architectures to manage a game to completeness. Traditionally, the game required all players to be collocated in order to participate and for the game to achieve completeness. In another example, the network system is configured to partition and wall-off funds from an initial deal to ensure capitalization of the linked deal. This enables the distributed network environment to more fully manage a game of chance that, traditionally, suffered problems of not being able to fully fund a linked deal. For example, players would not buy enough pull-tabs, or not participate in the linked deal because it occurred at a later time. Here, because the data structures are manufactured and distributed across a network system, that system can ensure that the manufactured deal(s) is fully funded and played to completeness by the networked implementation.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an electronic configuration linked through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable storage medium comprising stored computer program instructions executable by a processor to perform operations for evaluating an electronic game, the electronic game including a linked transaction with a data structure comprising a linked deal within an initial deal, the stored instructions, when executed, causing the processor to:
   transmit, responsive to a user selecting a request game icon in a display interface of an electronic gaming terminal, a request for an initial pull-tab for the initial deal to a deal management system, wherein:
      the deal management system is configured to manage a distributed network system comprising a plurality of electronic gaming terminals,
      the initial deal comprises a first randomized ordered set of electronic pull-tabs managed by the deal management system, and
      the first randomized ordered set of electronic pull-tabs comprises a set of pre-allocated electronic access tickets for the linked deal, with the set of pre-allocated electronic access tickets:
         completely allocated to the initial deal at manufacture of the data structure of the linked transaction, and
         configured for electronically accessing the linked deal across the distributed network system until the electronic game is complete based on the data structure of the linked transaction;
   receive, at the electronic gaming terminal, the initial pull-tab comprising a next electronic pull-tab in the first randomized ordered set of electronic pull-tabs, the next electronic pull-tab in the first randomized ordered set of electronic pull-tabs configured to provide for display on the display interface of the electronic gaming terminal;
   evaluate, responsive to the user selecting a play game icon in the display interface, an initial result of the initial pull-tab that comprises a pre-allocated electronic access ticket of the set of pre-allocated electronic access tickets to the linked deal;
   receive, from the deal management system, a linked pull-tab for the linked deal, wherein:
      the linked deal comprises a second randomized ordered set of electronic pull-tabs managed by the deal management system,
      the linked pull-tab comprises a next electronic pull-tab in a second randomized ordered set off electronic pull-tabs,
      the linked pull-tab is received from the deal management system across the distributed network system based on the data structure of the linked transaction, and
      the pre-allocated electronic access ticket resulting from the initial deal is configured to access the linked pull-tab;
   evaluate, responsive to the user selecting the play game icon in the display interface, a linked result of the linked pull-tab;
   evaluate, across the distributed network system based on the data structure of the linked transaction, a remainder of the first randomized ordered set of electronic pull-tabs in the initial deal and a remainder of the second randomized ordered set of electronic pull-tabs in the linked deal such that the electronic game is complete; and
   provide for display, on the display interface, the linked result of the linked pull-tab.

2. The non-transitory computer-readable storage medium of claim 1, the stored instructions further comprising instructions that, when executed, cause the processor to provide for display, on the display interface, the initial result of the initial pull-tab.

3. The non-transitory computer-readable storage medium of claim 1, the stored instructions further comprising instructions that, when executed, cause the processor to:
   provide for display, on the display interface and responsive to evaluating the linked result of the linked pull-tab, an updated prize state of the linked deal based on the evaluated linked result of the linked pull-tab.

4. The non-transitory computer-readable storage medium of claim 1, the stored instructions further comprising instructions that, when executed, cause the processor to:
   provide for display, on the display interface, a plurality of initial deal options, each of the initial deal options comprising a different randomized ordered list of pull-tabs managed by the deal management system; and
   receive, responsive to the user interacting with a selection icon on the display interface, a selection of the initial deal from the plurality of initial deal options.

5. The non-transitory computer-readable storage medium of claim 4, wherein one or more of the initial deal options in the plurality of initial deals comprise different progressive prizes.

6. The non-transitory computer-readable storage medium of claim 4, wherein one or more of the initial deals in the plurality of initial deal options comprise different odds for the initial deals.

7. The non-transitory computer-readable storage medium of claim 4, wherein one or more of the initial deals in the plurality of initial deal options are linked to different types of linked deals.

8. The non-transitory computer-readable storage medium of claim 1, wherein the instructions to evaluate, further comprises stored instructions that when executed causes the processor to fund the linked deal with a portion of an entrance capital value used to fund the initial deal.

9. The non-transitory computer-readable storage medium of claim 1, wherein the linked deal is a seal card game corresponding to the initial deal.

10. The non-transitory computer-readable storage medium of claim 1, wherein the linked deal is any of: a seal card game corresponding to the initial deal, a progressive seal card game corresponding to the initial deal, a bonus play game corresponding to the initial pull-tab, or a double up game corresponding to a linked funding value for the linked deal.

11. A system comprising:
a processor;
a non-transitory computer-readable storage medium comprising stored computer program instructions executable by the processor to perform operations for evaluating an electronic game, the electronic game including a linked transaction with a data structure comprising a linked deal within an initial deal, the stored instructions, when executed, causing the processor to:
transmit, responsive to a user selecting a request game icon in a display interface of an electronic gaming terminal, a request for an initial pull-tab for the initial deal to a deal management system, wherein:
the deal management system is configured to manage a distributed network system comprising a plurality of electronic gaming terminals,
the initial deal comprises a first randomized ordered set of electronic pull-tabs managed by the deal management system, and
the first randomized ordered set of electronic pull-tabs comprises a set of pre-allocated electronic access tickets for the linked deal, with the set of pre-allocated electronic access tickets:
completely allocated to the initial deal at manufacture of the data structure of the linked transaction, and
configured for electronically accessing the linked deal across the distributed network system until the electronic game is complete based on the data structure of the linked transaction;
receive, at the electronic gaming terminal, the initial pull-tab comprising a next electronic pull-tab in the first randomized ordered set of electronic pull-tabs, the next electronic pull-tab in the first randomized ordered set of electronic pull-tabs configured to provide for display on the display interface of the electronic gaming terminal;
evaluate, responsive to the user selecting a play game icon in the display interface, an initial result of the initial pull-tab that comprises a pre-allocated electronic access ticket of the set of pre-allocated electronic access tickets to the linked deal;
receive, from the deal management system, a linked pull-tab for the linked deal, wherein:
the linked deal comprises a second randomized ordered set of electronic pull-tabs managed by the deal management system,
the linked pull-tab comprises a next electronic pull-tab in a second randomized ordered set of electronic pull-tabs,
the linked pull-tab is received from the deal management system across the distributed network system based on the data structure of the linked transaction, and
the pre-allocated electronic access ticket resulting from the initial deal is configured to access the linked pull-tab;
evaluate, responsive to the user selecting the play game icon in the display interface, a linked result of the linked pull-tab;

evaluate, across the distributed network system based on the data structure of the linked transaction, a remainder of the first randomized ordered set of electronic pull-tabs in the initial deal and a remainder of the second randomized ordered set of electronic pull-tabs in the linked deal such that the electronic game is complete; and
provide for display, on the display interface, the linked result of the linked pull-tab.

12. A method for evaluating an electronic game, the electronic game including a linked transaction with a data structure comprising a linked deal within an initial deal, the method comprising:
transmitting, responsive to a user selecting a request game icon in a display interface of an electronic gaming terminal, a request for an initial pull-tab for the initial deal to a deal management system, wherein:
the deal management system is configured to manage a distributed network system comprising a plurality of electronic gaming terminals,
the initial deal comprises a first randomized ordered set of electronic pull-tabs managed by the deal management system, and
the first randomized ordered set of electronic pull-tabs comprises a set of pre-allocated electronic access tickets for the linked deal, with the set of pre-allocated electronic access tickets:
completely allocated to the initial deal at manufacture of the data structure of the linked transaction, and
configured for electronically accessing the linked deal across the distributed network system until the electronic game is complete based on the data structure of the linked transaction;
receiving, at the electronic gaming terminal, the initial pull-tab comprising a next electronic pull-tab in the first randomized ordered set of electronic pull-tabs, the next electronic pull-tab in the first randomized ordered set of electronic pull-tabs configured to provide for display on the display interface of the electronic gaming terminal;
evaluating, responsive to the user selecting a play game icon in the display interface, an initial result of the initial pull-tab that comprises a pre-allocated electronic access ticket of the set of pre-allocated electronic access tickets to the linked deal;
receiving, from the deal management system, a linked pull-tab for the linked deal: wherein:
the linked deal comprises a second randomized ordered set of electronic pull-tabs managed by the deal management system,
the linked pull-tab comprises a next electronic pull-tab in a second randomized ordered set off electronic pull-tabs,
the linked pull-tab is received from the deal management system across the distributed network system based on the data structure of the linked transaction, and
the pre-allocated electronic access ticket resulting from the initial deal is configured to access the linked pull-tab;
evaluating, responsive to the user selecting the play game icon in the display interface, a linked result of the linked pull-tab;
evaluating, across the distributed network system based on the data structure of the linked transaction, a remainder of the first randomized ordered set of electronic pull-tabs in the initial deal and a remainder of the second randomized ordered set of electronic pull-tabs in the linked deal such that the electronic game is complete; and providing for display, on the display interface, the linked result of the linked pull-tab.

13. The method of claim 12, further comprising: providing for display, on the display interface, the initial result of the initial pull-tab.

14. The method of claim 12, further comprising providing for display, on the display interface and responsive to evaluating the linked result of the linked pull-tab, an updated prize state of the linked deal based on the evaluated linked result of the linked pull-tab.

15. The method of claim 12, further comprising:

providing for display, on the display interface, a plurality of initial deal options, each of the initial deal options comprising a different randomized ordered list of pull-tabs managed by the deal management system; and receiving, responsive to the user interacting with a selection icon on the display interface, a selection of the initial deal from the plurality of initial deal options.

16. The method of claim 15, wherein one or more of the initial deal options in the plurality of initial deal options comprise different progressive prizes.

17. The method of claim 15, wherein one or more of the initial deal options in the plurality of initial deal options comprise different odds for the initial deals.

18. The method of claim 15, wherein one or more of the initial deal options in the plurality of initial deal options are linked to different types of linked deals.

19. The method of claim 12, further comprising funding the linked deal with a portion of an entrance capital value used to fund the initial deal.

* * * * *